US009085285B2

(12) United States Patent
DeVlieg et al.

(10) Patent No.: US 9,085,285 B2
(45) Date of Patent: Jul. 21, 2015

(54) SYSTEM AND METHOD FOR AIRCRAFT BRAKE METERING TO ALLEVIATE STRUCTURAL LOADING

(71) Applicant: Hydro-Aire, Inc., Burbank, CA (US)

(72) Inventors: Garrett H. DeVlieg, Bellevue, WA (US); John Gowan, Edmonds, WA (US)

(73) Assignee: Hydro-Aire, Inc., Burbank, CA (US)

( * ) Notice: Subject to any disclaimer, the term of this patent is extended or adjusted under 35 U.S.C. 154(b) by 9 days.

(21) Appl. No.: 14/152,457

(22) Filed: Jan. 10, 2014

(65) Prior Publication Data
US 2014/0156160 A1   Jun. 5, 2014

Related U.S. Application Data

(63) Continuation-in-part of application No. 13/653,940, filed on Oct. 17, 2012, now Pat. No. 8,727,454, which is a continuation of application No. 13/357,426, filed on Jan. 24, 2012, now Pat. No. 8,312,973, which is a
(Continued)

(51) Int. Cl.
*B60T 13/66* (2006.01)
*B60T 8/17* (2006.01)
*B60T 8/00* (2006.01)
*B60T 13/74* (2006.01)
*B60T 17/18* (2006.01)
*B64C 25/44* (2006.01)
*B60T 8/32* (2006.01)

(52) U.S. Cl.
CPC .............. *B60T 8/1703* (2013.01); *B60T 8/00* (2013.01); *B60T 13/746* (2013.01); *B60T 17/18* (2013.01); *B64C 25/445* (2013.01); *B60T 8/3255* (2013.01)

(58) Field of Classification Search
USPC ...... 188/1.11 L, 1.11 W, 158–164; 303/3, 20, 303/126; 244/111; 701/70
See application file for complete search history.

(56) References Cited

U.S. PATENT DOCUMENTS

| | | | |
|---|---|---|---|
| 3,920,282 A | 11/1975 | DeVlieg et al. |
| 3,948,569 A | 4/1976 | Genter et al. |
| 4,043,607 A | 8/1977 | Signorelli et al. |
| 4,234,063 A | 11/1980 | Blake |

(Continued)

FOREIGN PATENT DOCUMENTS

| | | | |
|---|---|---|---|
| EP | 0329373 A1 | 8/1989 |
| EP | 0384071 A1 | 8/1990 |

(Continued)

OTHER PUBLICATIONS

Japanese Office Action, Nov. 19, 2012, 2 pages.

*Primary Examiner* — Christopher Schwartz
(74) *Attorney, Agent, or Firm* — Fulwider Patton LLP

(57) ABSTRACT

In a system and method for aircraft brake metering to alleviate structural loading, one or more electric brake actuators for wheel brakes having a range of brake clamping force are provided, and a brake actuation controller is configured to monitor commanded initiation of the aircraft, to limit initial brake effort of the electric brake actuators to a preset fraction of a maximum possible braking effort for a preset period of time, and to permit brake effort of the electric brake actuators up to the maximum possible braking effort after the preset period of time after initiation of braking has been commanded. The preset fraction is preferably approximately 50% of the maximum possible braking effort, and may be tuneable. The preset period of time is preferably approximately one second, and also may be tuneable.

20 Claims, 4 Drawing Sheets

Related U.S. Application Data continuation of application No. 12/986,726, filed on Jan. 7, 2011, now Pat. No. 8,118,373, which is a continuation of application No. 12/826,531, filed on Jun. 29, 2010, now Pat. No. 7,878,602, which is a continuation of application No. 12/039,603, filed on Feb. 29, 2008, now Pat. No. 7,789,469, which is a continuation of application No. 11/337,097, filed on Jan. 19, 2006, now Pat. No. 7,410,224.

(56) References Cited

U.S. PATENT DOCUMENTS

| | | |
|---|---|---|
| 4,364,610 A | 12/1982 | Williams |
| 4,367,529 A | 1/1983 | Masclet et al. |
| 4,610,484 A | 9/1986 | Amberg et al. |
| 4,613,190 A | 9/1986 | Johnson |
| 4,923,056 A | 5/1990 | Nedelk |
| 4,986,610 A | 1/1991 | Beck et al. |
| 4,995,483 A | 2/1991 | Moseley et al. |
| 5,024,491 A | 6/1991 | Pease et al. |
| 5,050,940 A | 9/1991 | Bedford et al. |
| 5,172,960 A | 12/1992 | Chareire |
| 5,217,282 A | 6/1993 | Guichard |
| 5,417,477 A | 5/1995 | Lasbleis |
| 5,505,531 A | 4/1996 | Griffith |
| 5,845,975 A | 12/1998 | Wells |
| 6,036,285 A | 3/2000 | Murphy |
| 6,398,162 B1 | 6/2002 | Stimson et al. |
| 6,478,252 B1 | 11/2002 | Stimson et al. |
| 6,604,708 B1 | 8/2003 | DeVlieg |
| 6,659,233 B2 | 12/2003 | DeVlieg |
| 6,722,745 B2 | 4/2004 | Salamat et al. |
| 6,851,649 B1 | 2/2005 | Radford |
| 7,410,224 B2 * | 8/2008 | DeVlieg et al. ............... 303/126 |
| 7,441,844 B2 | 10/2008 | DeVlieg et al. |
| 7,506,730 B2 | 3/2009 | Strandberg et al. |
| 7,735,938 B2 | 6/2010 | DeVlieg et al. |
| 7,789,469 B2 * | 9/2010 | DeVlieg et al. ................... 303/3 |
| 7,878,602 B2 * | 2/2011 | DeVlieg et al. ................... 303/3 |
| 7,954,910 B2 | 6/2011 | DeVlieg et al. |
| 7,988,242 B2 | 8/2011 | DeVlieg et al. |
| 8,118,373 B2 * | 2/2012 | DeVlieg et al. ............... 303/126 |
| 8,312,973 B2 * | 11/2012 | DeVlieg et al. .......... 188/1.11 E |
| 8,727,454 B2 * | 5/2014 | DeVlieg et al. ............... 303/126 |
| 2004/0011596 A1 | 1/2004 | Miller et al. |
| 2005/0082999 A1 | 4/2005 | Ether |
| 2005/0104446 A1 | 5/2005 | Chico et al. |
| 2005/0231030 A1 | 10/2005 | Frank |
| 2005/0269872 A1 | 12/2005 | Ralea |
| 2006/0175897 A1 | 8/2006 | Ether |

FOREIGN PATENT DOCUMENTS

| | | |
|---|---|---|
| EP | 0443213 A2 | 8/1991 |
| JP | 10-508550 A | 8/1998 |
| JP | 2003508296 A | 3/2003 |

* cited by examiner

SYSTEM AND METHOD FOR AIRCRAFT BRAKE METERING TO ALLEVIATE STRUCTURAL LOADING

CROSS-REFERENCES TO RELATED APPLICATIONS

This application is a continuation-in-part of application Ser. No. 13/653,940, filed Oct. 17, 2012, which is a continuation of application Ser. No. 13/357,426, filed Jan. 24, 2012, now U.S. Pat. No. 8,312,973, which is a continuation of application Ser. No. 12/986,726, filed Jan. 7, 2011, now U.S. Pat. No. 8,118,373, which is a continuation of application Ser. No. 12/826,531, filed Jun. 29, 2010, now U.S. Pat. No. 7,878,602, which is a continuation of application Ser. No. 12/039,603, filed Feb. 29, 2008, now U.S. Pat. No. 7,789,469, which is a continuation of application Ser. No. 11/337,097, filed Jan. 19, 2006, now U.S. Pat. No. 7,410,224, which are incorporated by reference herein.

BACKGROUND OF THE INVENTION

This invention relates to a method and system for increasing accuracy of clamping force of electric brakes of aircraft, and more particularly relates to a method and system for increasing accuracy of clamping force of electric aircraft carbon brakes providing greater accuracy for low brake clamping force commands by dedicating a portion of a plurality of electric brake actuators of each brake to low brake clamping force commands, without otherwise affecting normal braking. The present invention also relates to a system and method for aircraft brake metering to alleviate structural loading, and more particularly relates to a system and method for metering aircraft brakes to alleviate structural loading of an aircraft by delaying a full onset of braking for a preset period of time, such as on any brake-by-wire aircraft where a brake metering function can be modified.

Commercial aircraft commonly have landing gear with electrically actuated brakes for wheels mounted to the wing and body of the aircraft. The electrically actuated brakes are typically carbon brakes including a torque plate and a carbon heat sink stack containing the friction surfaces that are clamped together by four electric brake actuators with a clamping brake force to cause a wheel to decrease its speed of rotation. In such a conventional airplane carbon brake system, when braking is commanded, either by a pilot's actuation of a brake pedal or automatic braking, it causes the friction surfaces of the carbon brakes to make contact, creating brake torque to slow down the rotational speed of the wheel, and through contact with the ground, the taxi speed of airplane.

As is described in U.S. Pat. No. 7,441,844, it is possible to reduce brake wear of electrically operated aircraft carbon brakes, once braking has been commenced, by maintaining a minimum light residual clamping brake force when braking is no longer commanded, such as when a pilot stops pressing on a brake pedal, or otherwise during a commanded release of braking during automatic braking. During taxiing of commercial aircraft, particularly at low speeds, steering of the aircraft is typically controlled by braking, and an unequal distribution of brake energy due to inaccurate metering of brake clamping force can in some instances interfere with the directional stability of aircraft, particularly when a minimum light residual clamping brake force is maintained during taxiing when braking is no longer commanded. Unequal distribution of brake energy due to inaccurate metering of brake clamping force can also result in damage to wheels and brakes from exposure to excessively high temperatures. It has been found that it is not possible with currently available electrical braking systems to achieve a brake clamping force accuracy required by current industry standards for the Boeing 787, and to prevent unequal distribution of brake energy.

Repeated rapid brake applications at low speed can also create fatigue loads on aircraft structural components. This is most apparent when the aircraft is taxiing at low speed and full rapid braking is commanded by a pilot by rapidly depressing the brake pedals. On some aircraft, such a condition will cause the nose gear of the aircraft (which does not typically have brakes) to bounce off the runway, because sudden braking loads are presented as a torque about the fuselage and reacted as a down force on the nose gear of the aircraft. Over the life of an aircraft, the design of the aircraft must take into account these structural loads so that the aircraft structure will not fail prematurely.

Previous known methods for alleviating airplane structural load during rapid low speed braking typically have involved the delayed application of some, but not all of the available brakes to reduce the aircraft structural loads and fatigue. Such selective delayed application of less than all available aircraft brakes, such as by applying only some of the available brakes while the remainder of the available brakes are not applied during an initial brake application during taxi conditions, can reduce aircraft structural loads.

One such conventional electric brake system for an aircraft is known that employs a brake control process to reduce high dynamic structural loading of the aircraft landing gear and lurching of the aircraft that can be caused by braking maneuvers. The system obtains current aircraft speed to determine that the aircraft is in taxi mode, current brake pedal deflection position, and deflection rate to determine whether to delay the onset of a desired braking condition.

It would be desirable to provide a system and method for alleviating aircraft structural loads during braking that does not require a logic condition of first determining that the aircraft is in taxi mode, and that does not require releasing and then reapplying some, but not all of the brakes during low speed braking. It would be desirable to provide a system and method for metering aircraft brakes to alleviate structural loading of an aircraft that does not rely upon the delayed application of brakes, but instead delays a full onset of braking for a preset period of time, to reduce aircraft structural loading, such as on any brake-by-wire aircraft where a brake metering function can be modified. The present invention meets these and other needs.

SUMMARY OF THE INVENTION

Briefly, and in general terms, in a first preferred embodiment, the present invention provides for a method and system for increasing accuracy of clamping force of electric aircraft carbon brakes, once braking has been commenced, by providing a first portion of electric brake actuators of each brake with a range of low brake clamping force responsive to low brake clamping force commands, and a second portion of electric brake actuators of each brake with a range of high brake clamping force responsive to high brake clamping force commands, and actuating the first portion of electric brake actuators with a range of low brake clamping force when the commanded braking force is in the low range of brake clamping force, and actuating the second portion of electric brake actuators with a range of high brake clamping force when the commanded braking force is in the high range of brake clamping force. The method and system of the first embodiment according to the invention provide electric brake actuation with greater accuracy and sensitivity to brake commands, particularly at low taxiing speeds requiring low brake clamping force levels, without otherwise affecting normal braking.

In a second preferred embodiment, the present invention provides for a system and method for metering aircraft brakes for aircraft with electric aircraft carbon brakes, in order to alleviate structural loading of an aircraft, by delaying a full onset of braking for a preset period of time, such as on any brake-by-wire aircraft where a brake metering function can be modified once braking has been commenced, without conditionally requiring a determination that the aircraft is travelling at a certain speed, such as a low taxiing speed. Accordingly, in a presently preferred aspect, the present invention provides for a system for metering aircraft brakes to alleviate structural loading of an aircraft by limiting initial application of braking force and delaying a full onset of braking for a preset period of time. The aircraft typically includes left and right landing gear with a plurality of wheels, and a corresponding plurality of wheel brakes configured to be actuated by commanded initiation of braking by brake clamping force commands. The system preferably includes one or more electric brake actuators for each of the plurality of wheel brakes having a range of brake clamping force responsive to brake clamping force commands, and a brake actuation controller configured to monitor commanded initiation of braking of the plurality of wheel brakes of the aircraft, to limit initial brake effort of the one or more electric brake actuators of each of the plurality of wheel brakes to a preset fraction of a maximum possible braking effort of the one or more electric brake actuators for a preset period of time, and to permit brake effort of the one or more electric brake actuators of each of the plurality of wheel brakes up to the maximum possible braking effort after the preset period of time after initiation of braking of the plurality of wheel brakes of the aircraft has been commanded.

In one presently preferred aspect, the system includes a plurality of electric brake actuators for each of the plurality of wheel brakes having a range of brake clamping force responsive to brake clamping force commands. In another presently preferred aspect, the preset fraction is approximately 50% of the maximum possible braking effort of the one or more electric brake actuators, although in another presently preferred aspect, the preset fraction is tuneable. In another presently preferred aspect, the preset period of time is approximately one second, although in another presently preferred aspect, the preset period of time is tuneable.

The present invention also provides for a method for metering aircraft brakes to alleviate structural loading of an aircraft by delaying a full onset of braking for a preset period of time, the aircraft having left and right landing gear with a plurality of wheels, and a corresponding plurality of wheel brakes configured to be actuated by commanded initiation of braking by brake clamping force commands. The method includes the steps of providing one or more electric brake actuators of each of the plurality of wheel brakes having a range of brake clamping force responsive to brake clamping force commands, monitoring commanded initiation of braking of the plurality of wheel brakes of the aircraft, limiting application of initial brake effort of the one or more electric brake actuators of each of the plurality of wheel brakes to a preset fraction of a maximum possible braking effort of the one or more electric brake actuators for a preset period of time in response to the commanded initiation of braking of the plurality of wheel brakes, and permitting brake effort of the one or more electric brake actuators of each of the plurality of wheel brakes up to the maximum possible braking effort after the preset period of time after initiation of braking of the plurality of wheel brakes of the aircraft has been commanded.

In one presently preferred aspect, a plurality of electric brake actuators are provided having a range of brake clamping force responsive to brake clamping force commands. In another presently preferred aspect, the preset fraction is approximately 50% of the maximum possible braking effort of the one or more electric brake actuators, although in another presently preferred aspect, the preset fraction is tuneable. In another presently preferred aspect, the preset period of time is approximately one second, although in another presently preferred aspect, the preset period of time is tuneable.

In another presently preferred aspect, the initiation of braking of the plurality of wheel brakes of the aircraft is commanded by depressing brake pedals of the aircraft by a pilot, and brake effort of the one or more electric brake actuators of each of the plurality of wheel brakes is permitted to increase up to the maximum possible braking effort after the preset period of time after the pilot has begun depressing the brake pedals.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
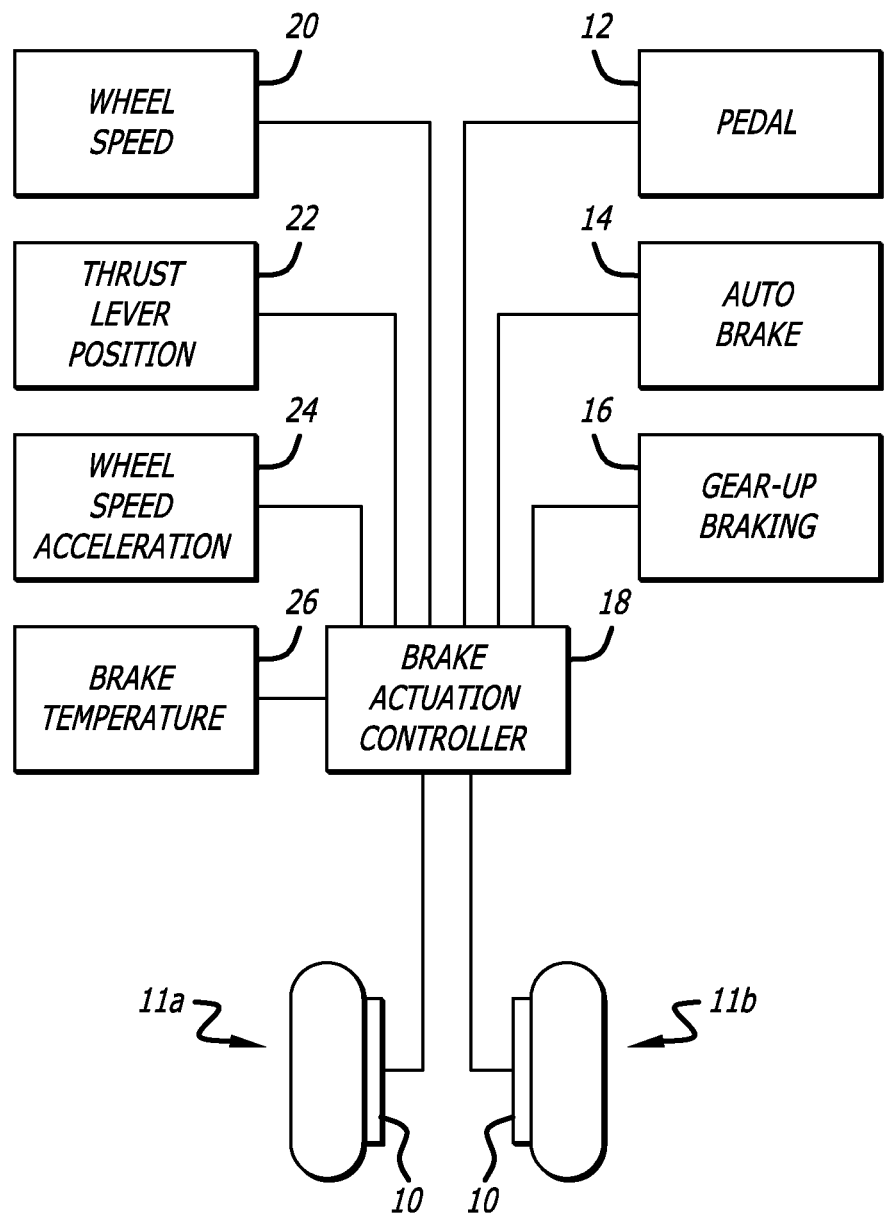
FIG. 1 is a schematic diagram of a system for controlling electric brakes of an aircraft, according to a first embodiment of the present invention.

While it is possible to reduce brake wear of electrically operated aircraft carbon brakes, once braking has been commenced, by maintaining a minimum light residual clamping brake force when braking is no longer commanded during taxiing of commercial aircraft, particularly at low speeds, unequal distribution of brake energy due to inaccuracy of brake clamping force can interfere with the directional stability of aircraft, and can result in damage to wheels and brakes from exposure to excessively high temperatures.

Referring to the drawings, which are provided for purposes of illustration and by way of example, the present invention accordingly provides for a method and system for controlling electrically operated aircraft brakes of an aircraft having a plurality of wheels and a corresponding plurality of wheel brakes for the plurality of wheels to increase accuracy of clamping force of electric aircraft brakes providing greater accuracy for low brake clamping force commands by dedicating a portion of a plurality of electric brake actuators of each brake to low brake clamping force commands, preventing an unequal distribution of brake clamping force without otherwise affecting normal braking, such as when the aircraft is taxiing.

As is illustrated in FIG. 1, according to a first embodiment according to first embodiment according to the invention, the commanded initiation of braking of any of the plurality of wheel brakes 10 of an aircraft, such as by actuation of brake pedal 12 by a pilot, an autobrake system 14, or gear-up braking system 16, for example, is monitored by a brake actuation controller 18, and a residual brake clamping force is set to a predetermined minimum residual brake clamping force by the brake actuation controller to keep the brakes engaged and provide a slight drag for the plurality of wheel brakes following the commanded initiation of braking. The predetermined minimum residual brake clamping force is typically set to about 1 to 0% of the maximum brake clamping force of the brake, and in a currently preferred aspect, is set to about 2 to 5 percent of the maximum brake clamping force of the brake.

Figure 2:
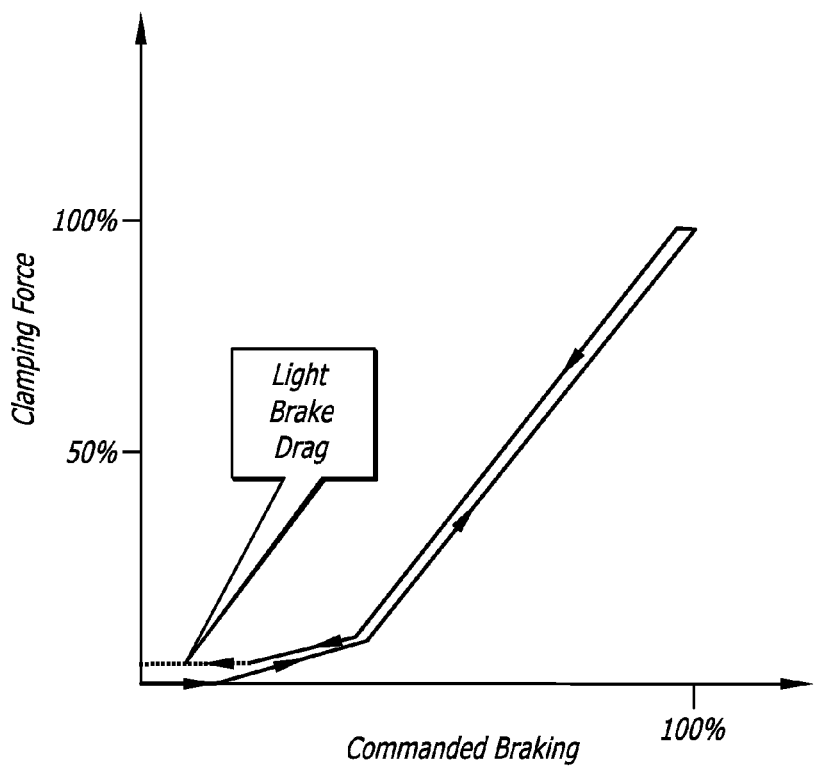
FIG. 2 is a graph illustrating the application of brake clamping force vs. commanded brake application according to the first embodiment of the present invention.

Once the residual minimum brake clamping force is engaged, it is maintained for the plurality of wheel brakes despite a commanded release of braking, such as by actuation of brake pedal by a pilot or an autobrake system, for example, of any of the plurality of wheel brakes. The application of the predetermined minimum residual brake clamping force is continued until one or more control logic conditions occurs, in response to which the application of the predetermined minimum residual brake clamping force is discontinued. In a preferred aspect, the predetermined minimum residual brake clamping force is discontinued by setting the residual brake clamping force to a "full dump" or substantially zero clamping force, so that the residual brake clamping force would continue to be a "full dump" or substantially zero clamping force until the brakes are applied again in the next commanded initiation of braking. As is illustrated in FIG. 2, application of the predetermined minimum residual brake clamping force is maintained after commanded release of braking results in a light brake drag during taxiing of an airplane.

Referring to FIG. 1, wheel speed monitors 20 for the wheels of the aircraft provide the wheel speed of the landing gear to the brake actuation controller, which determines the average wheel speed and compares the average wheel speed with a wheel speed threshold. A primary control logic condition under which the application of the predetermined minimum residual brake clamping force is discontinued occurs when the average wheel speed is below the predetermined wheel speed threshold, which in one presently preferred aspect is a wheel speed in a range of about 2 knots to about 10 knots, for example, in order to ensure full brake release during towing/push-back.

Typically when an aircraft has left landing gear 11a and right landing gear 11b, the average wheel speed of both the left and right landing gear may optionally be determined independently. The average wheel speeds of the left and right landing gear will be compared, and the lesser of the two average wheel speeds will be used to compare with the predetermined wheel speed threshold. The average wheel speed for each landing gear can be calculated independently in this manner so that when the airplane is turning and the inboard landing gear wheel speed is below the wheel speed threshold, the predetermined minimum residual brake clamping force will be discontinued.

In this control logic condition, when an aircraft has left and right landing gear, the predetermined minimum residual brake clamping force will be discontinued if the lesser of the two average wheel speeds is below the wheel speed threshold. The average wheel speed for each landing gear is calculated independently, so that when the airplane is turning and the inboard landing gear wheel speed is below the wheel speed threshold, the predetermined minimum residual brake clamping force will be discontinued. Disabling the brake drag force below a threshold will also ensure that the feature will not interfere with airplane towing operations, which typically happen at low speed. The brakes will also be fully released when the airplane is full stop. This will ensure that the brake drag will not interfere with parking brake operation, when maintenance personnel must replace the wheel/brake, during brake-released cooling on the ground, or during system checkout testing. Finally, disabling the brake drag force below a speed threshold will ensure that the brakes are released when stowed in the wheel well and prior to touchdown/wheel spinup.

A hysteresis can be incorporated into the wheel speed logic, such that once the wheel speed control logic condition has been met and the predetermined minimum residual brake clamping force has been discontinued, the predetermined minimum residual brake clamping force would not be applied upon the next commanded initiation of braking unless the aircraft first reaches a higher ground speed, such as 15 knots, for example, but the aircraft would again discontinue the predetermined minimum residual brake clamping force when the aircraft average wheel speed is below a lower speed, such as 2 knots, for example.

Engine thrust lever position may optionally be monitored to determine the pilot's intent to accelerate the airplane for takeoff or to begin taxi. An engine thrust lever position monitor 22 detects when any engine thrust lever is in an "advanced" position. If the predetermined minimum residual brake clamping force has been applied, the predetermined minimum residual brake clamping force will be discontinued if an engine thrust lever is detected to be in an "advanced" position. Once thrust levers are not in an "advanced" state, residual brake drag will be enabled after the pilot has subsequently depressed the brake pedal.

When the thrust levers are applied for takeoff, the wheel speed acceleration is quite significant and can be easily detected to positively inhibit any brake drag during takeoff. Therefore, optionally, a wheel speed acceleration monitor 24 can be provided to detect acceleration of the airplane for takeoff or taxiing, and as an alternative to monitoring of engine thrust lever position. The brake actuation controller can compare the wheel speed acceleration with a predetermined acceleration threshold, and application of the predetermined minimum residual brake clamping force may be discontinued if wheel speed acceleration beyond the preset acceleration threshold.

The brake temperature monitor system 26 may also be used to provide brake temperature readings to the brake actuation controller to compare with a predetermined temperature threshold, so that the application of the predetermined minimum residual brake clamping force can optionally be discontinued if the brake temperature increases above the temperature threshold. This way the residual brake force will not cause the brake temperature to become too high. Once the brake temperature is above the temperature threshold, carbon brake wear is already reduced because carbon brake wear rates are known to be less at high temperature.

Another optional control logic condition under which the application of the predetermined minimum residual brake clamping force could be discontinued can occur if the distance the aircraft has rolled with a predetermined minimum residual brake drag applied has exceeded a distance threshold. The roll distance traveled can be determined by the brake actuation controller by using data from the wheel speed monitor and tracking the time since the last brake application command. Once the roll distance has increased above a set threshold, such as two miles, for example, the predetermined minimum residual brake clamping force will be discontinued to prevent the brakes from becoming hotter.

Examples of circumstances in which one or more of the control logic conditions should ideally apply to interrupt application of predetermined minimum residual brake application clamping force include: during towing and push-back, so that the tow tractor doesn't have to cope with the brake drag; during touchdown/wheel spinup; during antiskid cycling when full dumps are commanded; on the outboard gear during tight turns, since release of the residual drag may be desirable so that the brakes don't fight the turn; with the landing gear stowed, which may be desirable for cooling the landing gear in the wheel well; and when parked with the parking brake released, which also may be desirable for brake cooling. Typically for such circumstances as touchdown, spinup, and during antiskid cycling, an antiskid system already overrides metered braking pressure. While for tight turns it may also be desirable to optionally implement a steering control logic condition by monitoring steering or tiller position, this would normally not be necessary, since typically release of the predetermined minimum residual brake clamping force would already take place when any such tight turns might occur, due to the monitoring of wheel speed as a control logic condition. During turns, the speed of the wheels on the inboard side of the turn will travel more slowly than those on the outboard side, and the differential will become greater as the turn gets tighter. The effect of the wheel speed logic would be to remove the "slight drag" virtually any time the aircraft makes a tight turn, thereby reducing the differential thrust required to make the turn.

Although it is also possible to optionally monitor stowing of the landing gear and parking, due to monitoring of wheel speed, release of the predetermined minimum residual brake clamping force would normally take place when the landing gear is stowed or the airplane is parked, due to the control logic that releases the brakes below a wheel speed threshold. It should also be noted that brake release commands from an antiskid control system always override any brake application command, i.e. a full release from the antiskid control system will always result in full release of the brake application clamping force.

The result for various phases of operation is as follows:

Parked at the ramp: Brakes will fully release (wheel speed below 2 to 10 knots).

Pushback: Brakes will fully release (wheel speed below 2 to 10 knots).

Very slow taxi (below 2 to 10 knots): Brakes will fully release (wheel speed below 2 to 10 knots).

Normal taxi (above 2 to 10 knots): Brakes will fully release until first brake snub, and then brakes will gently "ride."

Tight turns: Brakes will fully release (tight turns require slow speed, inboard-gear wheel speed below 2 to 10 knots).

Takeoff Roll:
  Normal operation: Brakes will fully release (thrust levers advanced).
  Abnormal operation: For RTO with sufficient braking to induce antiskid action, brakes will fully release until 1st brake application. Then brakes will fully release whenever antiskid commands it. If antiskid doesn't command full release then brakes will gently "ride".

Liftoff: Brakes will fully release (thrust levers advanced).

Gear retract: Brakes apply due to gear retract braking, then fully release when gear retract braking command is removed (wheel speed below 2 to 10 knots).

Stowage in wheel well: Brakes will fully release (wheel speed below 2 to 10 knots).

Gear extension before touchdown: Brakes will fully release (wheel speed below 2 to 10 knots).

Touchdown/spinup (pedals not applied).
  Normal operation: Brakes will fully release (brakes not re-applied since wheel speed below 2 to 10 knots).
  Abnormal operation: Touch down/spinup with pedals applied, brakes will fully release (touchdown/hydroplane protection already resident in antiskid).

Landing rollout, either manual or automatic braking (no antiskid action).
  Normal operation: Brakes will fully release until 1st brake application. Then brakes will gently "ride."
  Abnormal operation: Landing rollout with sufficient braking to induce antiskid action, brakes will fully release until 1st brake application. Then brakes will fully release whenever antiskid commands it. If antiskid doesn't command full release then brakes will gently "ride."

Taxi in (above 2 to 10 knots): Brakes will fully release until 1st brake snub. Then brakes will gently "ride."

Final maneuvering and docking (below 2 to 10 knots): Brakes will fully release (wheel speed below 2 to 10 knots).

Setting the parking brake, then releasing: Brakes will fully release (wheel speed below 2 to 10 knots).

Operation with hot brakes: Brakes will fully release at all times (hot brakes per brake temp monitor).

Figure 3:
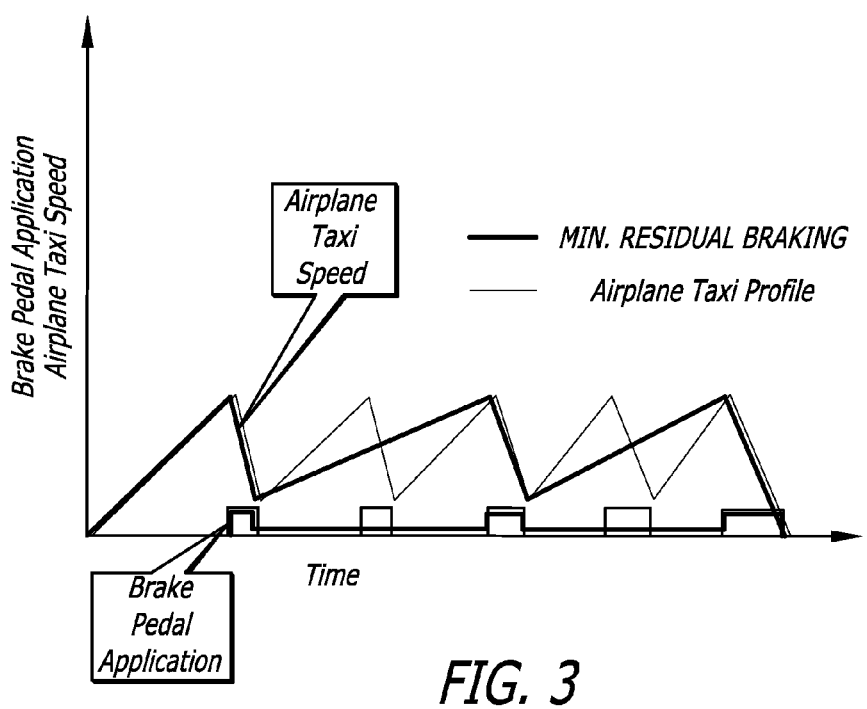
FIG. 3 is a schematic diagram of a system for controlling first and second pairs of electric brake actuators of an electric brake of FIG. 1, according to the first embodiment of the present invention.

As is illustrated in FIG. 3, the overall brake energy for normal braking with multiple brake snubs is substantially equivalent to controlling application of aircraft carbon brakes according to the first embodiment according to the invention, but the number of taxi brake applications is reduced from five brake applications using normal braking, to one braking application by the method of the first embodiment according to the invention. The number of taxi brake applications thus can be substantially reduced by the method of the first embodiment according to the invention, resulting in significantly reduced aircraft carbon brake wear.

Figure 4:
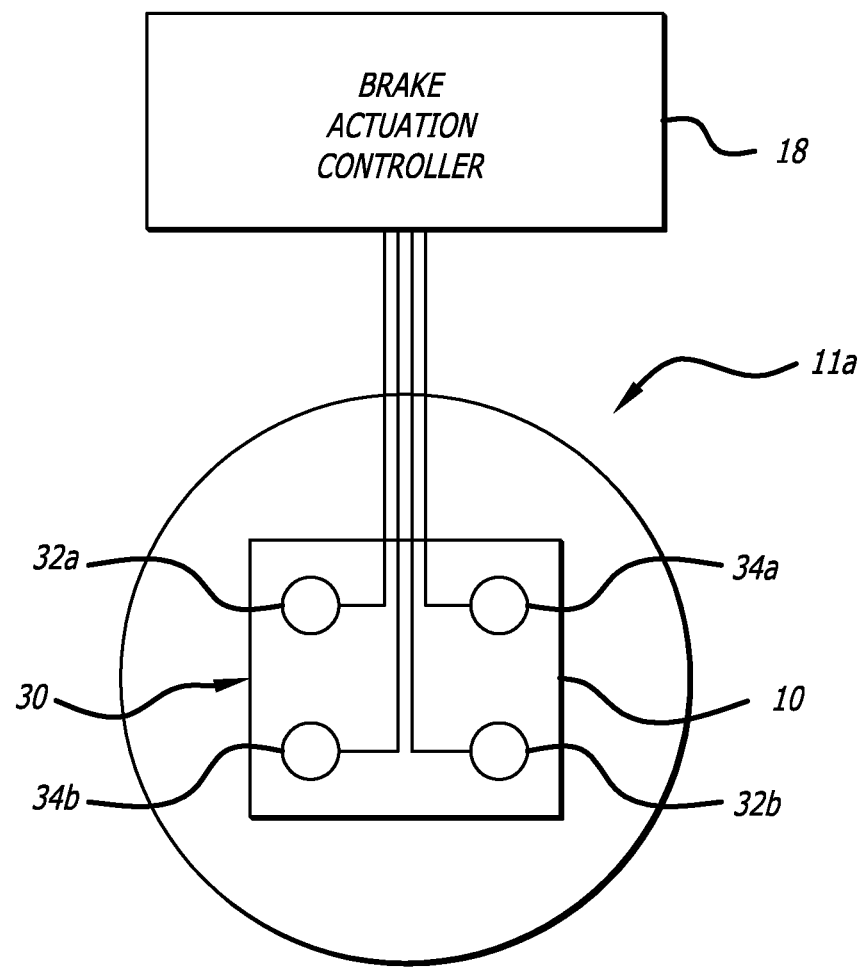
FIG. 4 is a schematic diagram of the system for increasing brake clamping force accuracy according to the first embodiment of the present invention.

As is illustrated in FIG. 4, in the method and system of the first embodiment according to the invention, each individual brake 10 is provided with a plurality of electric brake actuators 30, consisting of a first portion of electric brake actuators, such as a first pair of electric brake actuators 32a, 32b, having a first range of low brake clamping force responsive to low brake clamping force commands, and a second portion of electric brake actuators, such as a second pair of electric brake actuators 34a, 34b, having a second range of high brake clamping force responsive to high brake clamping force commands. The first and second pairs of electric brake actuators are connected to the brake actuation controller 18, and in a preferred aspect, the first and second pairs of electric brake actuators are arranged in a balanced configuration in the brake, such as with the first pair of electric brake actuators 32a, 32b placed in radially opposing positions in the brake, and the second pair of electric brake actuators 34a, 34b similarly placed in radially opposing positions in the brake. In a presently preferred aspect, the second pair of electric brake actuators are placed between the first pair of electric brake actuators, and the second pair of electric brake actuators are typically placed symmetrically between the first pair of electric brake actuators.

Once the residual minimum brake clamping force is engaged, it is maintained for the plurality of wheel brakes despite a commanded release of braking, such as by actuation of brake pedal by a pilot, an autobrake system, or gear-up braking system, for example, of any of the plurality of wheel brakes. In a preferred aspect, the first pair of electric brake actuators 32a, 32b, is actuated to maintain the predetermined minimum residual brake clamping force until one or more control logic conditions occurs, in response to which the application of the predetermined minimum residual brake clamping force is discontinued, and the second pair of electric brake actuators 34a, 34b, is engaged only when the braking force to be applied falls within the second range of high brake clamping force. When the commanded braking force falls below the second range of high brake clamping force, the second pair of electric brake actuators is disengaged. The cumulative range of clamping force of the first and second pairs of electric brake actuators is equivalent to that of current electric brake actuators, but because the entire range is divided between the first and second portions of electric brake actuators, and the accuracy of the first portion of low force electric brake actuators applies over a smaller range, the cumulative brake force of the first and second portions of electric brake actuators is significantly improved, particularly at low speeds, when steering of the aircraft is commonly controlled by braking, and particularly when a minimum light residual clamping brake force is maintained during taxiing when braking is no longer commanded.

Referring to FIGS. 1, 4, 5 and 6, in a second preferred embodiment, the invention provides for a system and method for metering aircraft brakes to alleviate structural loading of an aircraft by delaying a full onset of braking for a preset period of time, such as on any brake-by-wire aircraft where a brake metering function can be modified.

Figure 5:
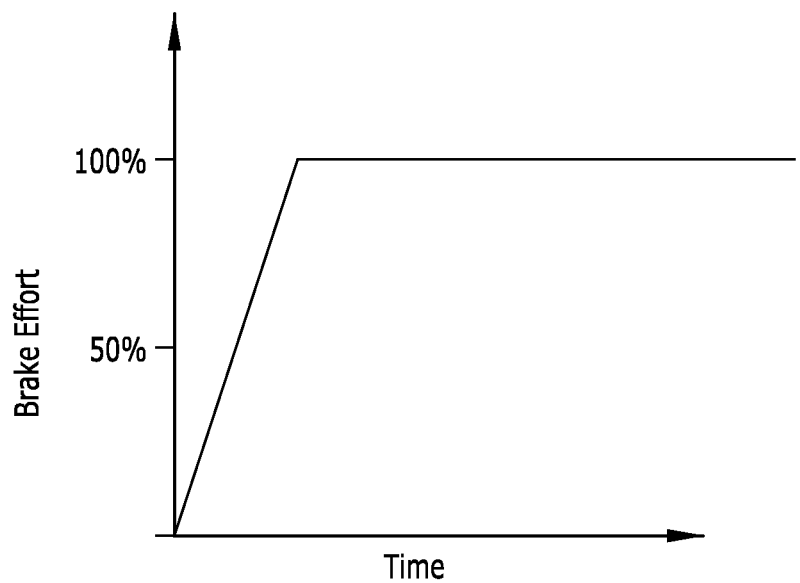
FIG. 5 is a graph illustrating a prior art brake onset curve showing brake effort vs. time.

If a conventional brake control system does not include a load alleviation feature, the brake onset curve will appear as is illustrated in FIG. 5, which generally shows the relationship between a range of brake force output command to the brakes, from zero brake force to maximum brake force, commencing at a time when brake force is initiated, such as when a brake pedal command from a pilot occurs.

Figure 6:
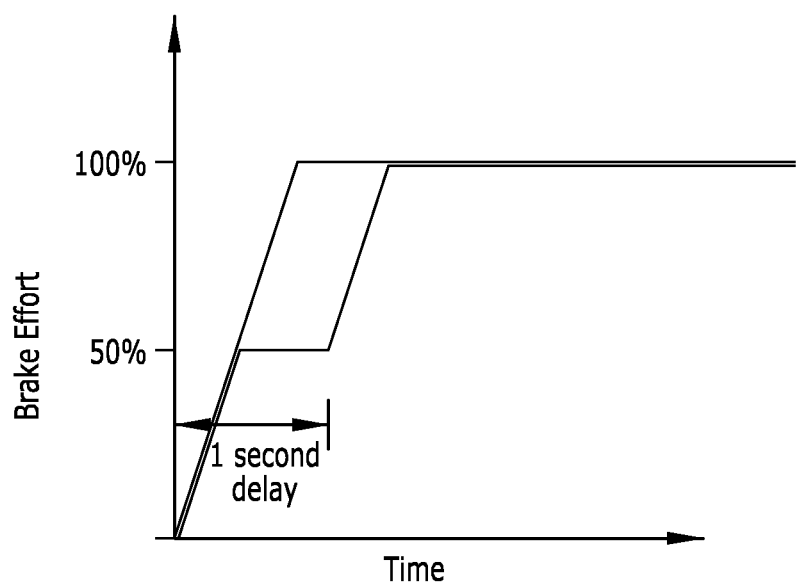
FIG. 6 is a graph illustrating showing a brake onset curve showing brake effort vs. time, according to the system and method of the second embodiment of the present invention.

In contrast, as is illustrated in FIG. 6, in the system and method according to the second preferred embodiment of the invention, initial application of brake force is limited for a preset period of time and a delayed onset of implementation of full brake force is introduced in order to alleviate airplane structural loading. Also referring to FIGS. 1 and 4, the system according to the second preferred embodiment of the invention provides for metering aircraft brakes to alleviate structural loading of an aircraft typically having left and right landing gear with a plurality of wheels, and a corresponding plurality of wheel brakes configured to be actuated by commanded initiation of braking by brake clamping force commands, by limiting initial application of braking force and delaying a full onset of braking for a preset period of time. The system preferably includes one or more electric brake actuators of each of the plurality of wheel brakes having a range of brake clamping force responsive to brake clamping force commands, a plurality of electric brake actuators for each of the plurality of wheel brakes having a range of brake clamping force responsive to brake clamping force commands, and a brake actuation controller configured to monitor commanded initiation of braking of the plurality of wheel brakes of the aircraft, to limit initial brake effort of the one or more electric brake actuators of each of the plurality of wheel brakes to a preset fraction of a maximum possible braking effort of the one or more electric brake actuators for a preset period of time, and to permit brake effort of the one or more electric brake actuators of each of the plurality of wheel brakes up to the maximum possible braking effort after the preset period of time after initiation of braking of the plurality of wheel brakes of the aircraft has been commanded.

As is illustrated in FIG. 6, in another presently preferred aspect, the preset fraction is approximately 50% of the maximum possible braking effort of the one or more electric brake actuators, although in another presently preferred aspect, the preset fraction is tuneable. In another presently preferred aspect, the preset period of time is approximately one second, although in another presently preferred aspect, the preset period of time is tuneable.

The present invention also provides for a method for metering aircraft brakes to alleviate structural loading of an aircraft by delaying a full onset of braking for a preset period of time, the aircraft having left and right landing gear with a plurality of wheels, and a corresponding plurality of wheel brakes configured to be actuated by commanded initiation of braking by brake clamping force commands. The method includes the steps of providing one or more electric brake actuators of each of the plurality of wheel brakes having a range of brake clamping force responsive to brake clamping force commands, providing a plurality of electric brake actuators for each of the plurality of wheel brakes having a range of brake clamping force responsive to brake clamping force commands, monitoring commanded initiation of braking of the plurality of wheel brakes of the aircraft, limiting application of initial brake effort of the one or more electric brake actuators of each of the plurality of wheel brakes to a preset fraction of a maximum possible braking effort of the one or more electric brake actuators for a preset period of time in response to the commanded initiation of braking of the plurality of wheel brakes, and permitting brake effort of the one or more electric brake actuators of each of the plurality of wheel brakes up to the maximum possible braking effort after the preset period of time after initiation of braking of the plurality of wheel brakes of the aircraft has been commanded.

In another presently preferred aspect, the preset fraction is approximately 50% of the maximum possible braking effort of the one or more electric brake actuators, although in another presently preferred aspect, the preset fraction is tuneable. In another presently preferred aspect, the preset period of time is approximately one second, although in another presently preferred aspect, the preset period of time is tuneable.

Also referring to FIGS. 1, 4 and 6, in another presently preferred aspect, the initiation of braking of the plurality of wheel brakes of the aircraft is commanded by depressing brake pedals of the aircraft by a pilot, and brake effort of the one or more electric brake actuators of each of the plurality of wheel brakes is permitted to increase up to the maximum possible braking effort after the preset period of time after the pilot has begun depressing the brake pedals.

Accordingly it should be understood that the preferred onset of braking is accomplished by delaying full brake effort to approximately 50% of the maximum possible braking effort for approximately one second after a pilot has begun depressing the brake pedals, although this preset fraction of braking effort and the preset period of time are tuneable, as desired. This feature is not intended to interfere with normal taxi brake applications, which are usually much less than the maximum possible brake effort and occur at a rate much less than the maximum possible rate.

It is not necessary to determine whether the airplane is in a low speed taxiing mode, and the feature can operate during maximum effort braking stops during landings or refused takeoffs at all airplane groundspeeds. Alternatively, the initial limitation of a preset fraction of maximum brake force may be removed if a determination is made that the aircraft is travelling at a high speed, such as in the event of a refused takeoff or a maximum braking effort landing stop situation, in order to not limit the braking effort in such an emergency situation, although implementation of an initial limitation of a preset fraction of maximum brake force can actually improve aircraft stopping performance in such emergency situations, since the severity of a first skid on aircraft brakes would typically be limited by an anti-skid braking system, allowing maximum aircraft stopping performance when necessary.

It will be apparent from the foregoing that, while particular forms of the invention have been illustrated and described, various modifications can be made without departing from the spirit and scope of the invention. Accordingly, it is not intended that the invention be limited, except as by the appended claims.

The invention claimed is:

1. A system for metering aircraft brakes to alleviate structural loading of an aircraft by delaying a full onset of braking for a preset period of time, the aircraft having left and right landing gear with a plurality of wheels, and a corresponding plurality of wheel brakes configured to be actuated by commanded initiation of braking by brake clamping force commands, comprising:
   at least one electric brake actuator for each of the plurality of wheel brakes having a range of brake clamping force responsive to brake clamping force commands; and
   a brake actuation controller configured to monitor commanded initiation of braking of the plurality of wheel brakes of the aircraft, to limit initial brake effort of said at least one electric brake actuator of each of the plurality of wheel brakes to a preset fraction of a maximum possible braking effort of said at least one electric brake actuator for a preset period of time, and to permit brake effort of said at least one electric brake actuator of each of the plurality of wheel brakes up to the maximum possible braking effort after the preset period of time after initiation of braking of the plurality of wheel brakes of the aircraft has been commanded.

2. The system of claim 1, wherein said at least one electric brake actuator comprises a plurality of electric brake actuators for each of the plurality of wheel brakes having a range of brake clamping force responsive to brake clamping force commands.

3. The system of claim 1, wherein said preset fraction is approximately 50% of the maximum possible braking effort of said at least one electric brake actuator.

4. The system of claim 1, wherein said preset fraction is tuneable.

5. The system of claim 1, wherein said preset period of time is approximately one second.

6. The system of claim 1, wherein said preset period of time is tuneable.

7. The system of claim 1, wherein said initiation of braking of the plurality of wheel brakes of the aircraft is commanded by depressing brake pedals of the aircraft by a pilot, and brake effort of said at least one electric brake actuator of each of the plurality of wheel brakes is permitted to increase up to the maximum possible braking effort after said preset period of time after the pilot has begun depressing the brake pedals.

8. The system of claim 7, wherein said preset period of time is approximately one second.

9. The system of claim 7, wherein said preset period of time is tuneable.

10. The system of claim 7, wherein said preset fraction is tuneable.

11. A method for metering aircraft brakes to alleviate structural loading of an aircraft by delaying a full onset of braking for a preset period of time, the aircraft having left and right landing gear with a plurality of wheels, and a corresponding plurality of wheel brakes configured to be actuated by commanded initiation of braking by brake clamping force commands, comprising:
   providing at least one electric brake actuator for each of the plurality of wheel brakes having a range of brake clamping force responsive to brake clamping force commands;
   monitoring commanded initiation of braking of the plurality of wheel brakes of the aircraft;
   limiting application of initial brake effort of said at least one electric brake actuator of each of the plurality of wheel brakes to a preset fraction of a maximum possible braking effort of said at least one electric brake actuator for a preset period of time in response to said commanded initiation of braking of the plurality of wheel brakes; and
   permitting brake effort of said at least one electric brake actuator of each of the plurality of wheel brakes up to the maximum possible braking effort after the preset period of time after initiation of braking of the plurality of wheel brakes of the aircraft has been commanded.

12. The method of claim 11, wherein said step of providing at least one electric brake actuator comprises providing a plurality of electric brake actuators for each of the plurality of wheel brakes having a range of brake clamping force responsive to brake clamping force commands.

13. The method of claim 12, wherein initiation of braking of the plurality of wheel brakes of the aircraft is commanded by depressing brake pedals of the aircraft by a pilot, and brake effort of said at least one electric brake actuator of each of the plurality of wheel brakes is permitted to increase up to the maximum possible braking effort after said preset period of time after the pilot has begun depressing the brake pedals.

14. The method of claim 13, wherein said preset period of time is approximately one second.

15. The method of claim 13, wherein said preset period of time is tuneable.

16. The method of claim 13, wherein said preset fraction is tuneable.

17. The method of claim 11, wherein said preset fraction is approximately 50% of the maximum possible braking effort of said at least one electric brake actuator.

18. The method of claim 11, wherein said preset fraction is tuneable.

19. The method of claim 11, wherein said preset period of time is approximately one second.

20. The method of claim 11, wherein said preset period of time is tuneable.

* * * * *